United States Patent [19]

Inoue

[11] Patent Number: 4,549,062
[45] Date of Patent: Oct. 22, 1985

[54] LOW-POWER AVAILABILITY PROTECTION FOR ELECTRICAL MACHINING APPARATUS

[75] Inventor: Kiyoshi Inoue, Tokyo, Japan

[73] Assignee: Inoue-Japax Research Inc., Kanagawaken, Japan

[21] Appl. No.: 413,234

[22] Filed: Aug. 31, 1982

[30] Foreign Application Priority Data

Sep. 3, 1981 [JP] Japan .................... 56-131881[U]

[51] Int. Cl.⁴ .............................................. B23P 1/02
[52] U.S. Cl. .............................. 219/69 W; 219/69 D; 219/69 C
[58] Field of Search ................ 219/69 W, 69 C, 69 S, 219/69 R, 69 P; 361/59, 18; 307/38–41

[56] References Cited

U.S. PATENT DOCUMENTS

| | | | |
|---|---|---|---|
| 2,864,049 | 12/1958 | Sheets | 307/39 X |
| 4,011,484 | 3/1977 | Paice et al. | 361/59 |
| 4,234,904 | 11/1980 | Fahlesson | 307/39 |
| 4,256,951 | 3/1981 | Payne et al. | 219/486 |
| 4,317,019 | 2/1982 | Itoh | 219/69 W |

Primary Examiner—M. H. Paschall
Attorney, Agent, or Firm—Karl F. Ross; Herbert Dubno

[57] ABSTRACT

An electrical machining apparatus incorporating features against malfunctioning or delay to reach a normal operation upon recovery from a power failure or shut-off in the input source is provided. The apparatus having a plurality of electrical output devices, e.g. a machining power supply, a fluid pumping system and a feed drive unit is provided with a plural gate unit connected between the input source and each of the plural output devices. The plural gate circuit units are disabled in response to the power failure or shut-off for jointly holding all the output devices electrically deenergized, respectively. A sequential trigger circuit operates in response to a recovery from the power failure or shut-off for sequentially producing a plurality of trigger signals and enabling the plural gate circuit units therewith respectively whereby to commence energizing the respective output devices in a predetermined sequence.

8 Claims, 2 Drawing Figures

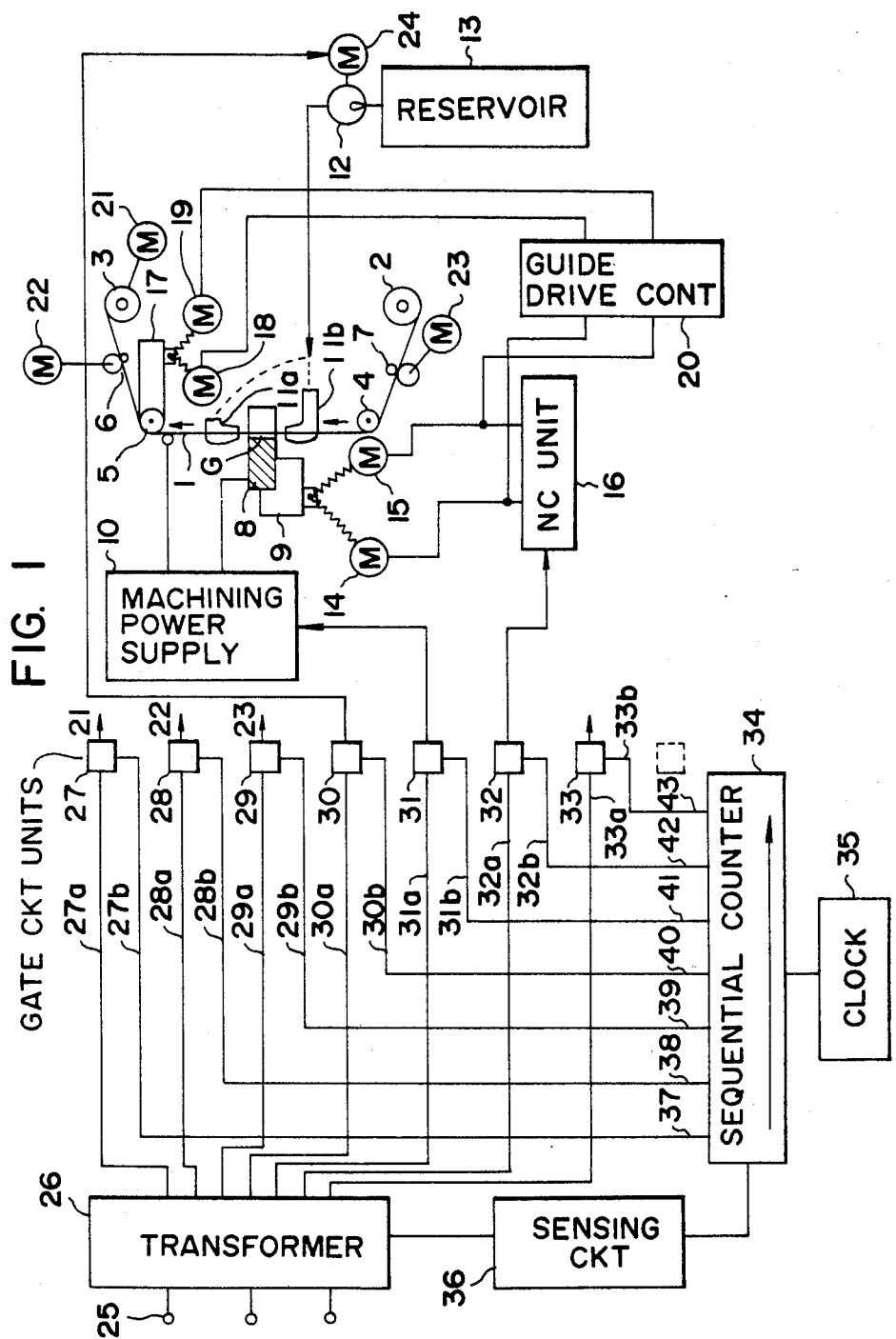

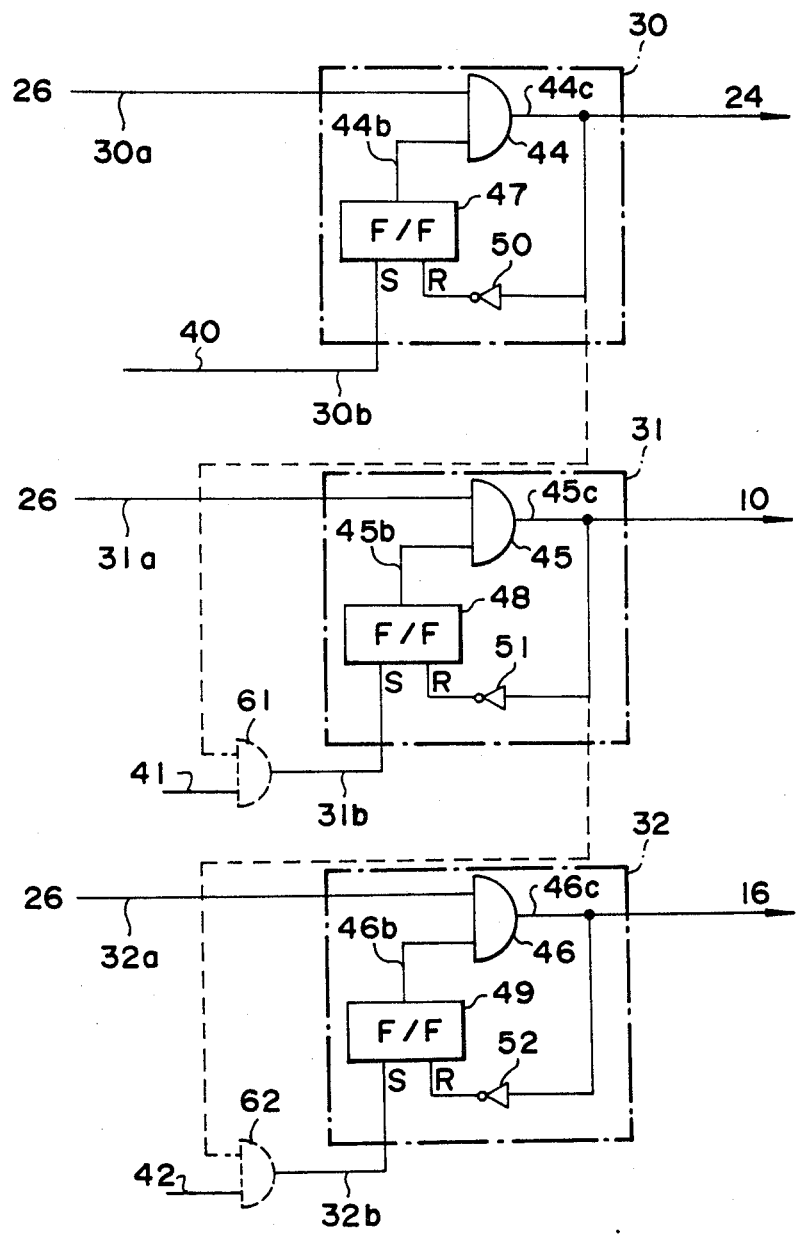

LOW-POWER AVAILABILITY PROTECTION FOR ELECTRICAL MACHINING APPARATUS

FIELD OF THE INVENTION

The field to which the present invention relates is electrical machining such as electrical discharge machining (EDM), electrochemical machining (ECM) or electrochemical grinding (ECG). The invention is particularly related to a solution of certain problems associated with a power failure or shut-off which may be caused in an input power source for operating an electrical machining apparatus.

BACKGROUND OF THE INVENTION

An electrical machining apparatus is commonly designed to electroerosively shape a conductive workpiece with a tool electrode in the presence of a machining fluid medium and includes a multiplicity of electrical output means such as a fluid supply unit for pumping the fluid medium into a gap formed between the tool electrode and the workpiece, a power supply for passing an electrical machining current between the tool electrode and the workpiece across the fluid-filled machining gap to electroerosively remove material from the workpiece and a drive unit for relatively displacing the tool electrode and the workpiece to advance the material removal in the workpiece. All such electrical output means are commonly designed to be energized from a single input source of electric power for performing their respective operating functions. Thus, when a power failure happens to occur or a power shut-off needs to be exercised, these multiple electrical output means are deenergized simultaneously. Upon recovery of electric power after the failure or shut-off in the input source, it has been the conventional design that these multiple output means are simply arranged to follow the power recovery.

It has now been recognized that such conventional arrangement has been a major source of difficulties which prevent the machining apparatus from performing a given machining operation efficiently and on a full automatic basis. With all the multiple electrical output means allowed to start driving at the same time, the power input may be deficient to permit each individual output means to start operating normally or without undue delay in restoring the normal operating mode.

OBJECT OF THE INVENTION

The present invention seeks to provide a new and improved electrical machining apparatus which, upon recovery after a power failure or shut-off in the input source, is capable of restoring its multiple operating functions promptly and without failure.

SUMMARY OF THE INVENTION

In accordance with the present invention there is provided a machining apparatus for shaping a conductive workpiece with a tool electrode in the presence of a machining fluid medium, which apparatus comprises: a plurality of electrical output means electrically energizable from a single input source of electric power to perform their respective operating functions including means for pumping the fluid medium into a gap formed between the tool electrode and the workpiece, means for passing an electrical machining current between the tool electrode and the workpiece across the fluid-filled gap to electroerosively remove material from the workpiece and means for relatively displacing the tool electrode and the workpiece to advance the material removal in the workpiece; a plural gate circuit means connected between the single input source and each of the said plurality of electrical output means, the plural gate circuit means being adapted to be disabled in response to a failure or shut-off of electric power in the source for jointly holding the said plurality of electrical output means electrically deenergized, respectively; and a sequential trigger circuit means operable in response to a recovery of electric power in the source for sequentially producing a plurality of signals and enabling the plural gate circuit means therewith respectively whereby to commence energizing the respective output means in a predetermined sequence.

BRIEF DESCRIPTION OF THE DRAWING

These and other features of the present invention as well as advantages thereof will become more readily apparent from a reading of the following description of certain embodiments thereof when taken with reference to the accompanying drawing in which:

FIG. 1 is a diagrammatic view of a typical electrical machining apparatus incorporating the principle of the present invention; and FIG. 2 is a circuit diagram of a portion of the circuit diagram shown in FIG. 1.

SPECIFIC DESCRIPTION

Referring to the drawing FIG. 1, there is shown a traveling-wire electrical machining apparatus incorporating the principles of the present invention. In the apparatus, a wire electrode 1 is shown being fed from a supply reel 2 and collected onto a takeup reel 3. The term "wire electrode" is used herein to refer to a wire, filamentary or like thin, elongate and continuous electrode which has typically a thickness or diameter ranging between 0.05 and 0.5 mm and may be composed of copper or brass. The wire electrode 1 is supported between a pair of guide members 4 and 5 which are designed to define a straight line path for the wire electrode 1. The wire electrode 1 is axially driven by a drive unit 6 in the direction of the arrow indicated under tension applied by a braking unit 7 in a conventional design arrangement.

A conductive workpiece 8 is shown disposed between the guide members 4 and 5 so as to be traversed by the linear traveling stretch of the wire electrode 1 therebetween. The workpiece 8 is securely mounted on a worktable 9. An electrical machining power supply 10 is electrically connected to the traveling wire electrode 1 and the workpiece 8 for passing an electrical machining current therebetween across a gap G flushed with a machining fluid medium to electroerosively remove material from the workpiece 8 against the traveling wire electrode 1. The electrical machining current is typically in the form of a succession of electrical pulses. The machining fluid medium, which is here typically a distilled water liquid, is supplied into the gap G via a pair of nozzles 11a and 11b under pressure by a pump 12 from a reservoir 13.

The worktable 9 is driven by a pair of motors 14 and 15 to displace the workpiece 8 in a horizontal plane transverse and generally orthogonal to the axis of the wire electrode 1 traveling between the wire guide members 4 and 5. The motors 14 and 15 are driven with drive signals furnished from a numerical-control (NC) unit 16 having data preprogrammed therein to displace the workpiece 8 relative to the wire electrode 1 along a prescribed path corresponding to a desired shaping contour to be machining in the workpiece 8.

In the arrangement illustrated, the upper wire guide member 5 is supported by an arm 17 which is driven by a pair of further motors 18 and 19 which are again controllably driven by the NC unit 16 via a control drive circuit 20. The drive unit 18, 19, 20 may be used where it is desirable to impart a taper to the contour to be machined in the workpiece 8.

The wire takeup reel 3 is driven by a motor 21. The wire traction drive 6 comprises a capstan-pinch roller unit which is driven by a motor 22. The wire braking drive 7 likewise comprises a capstan-pinch roller unit which is driven by a motor 23. The pump 12 is driven by a motor 24.

In the apparatus shown, the motors 21, 22, 23, 24, the power supply 10, the NC unit 16 and any further electrical output devices are energized by a single input source of electric power, which is typically a three-phase commercial AC line input 25, via a transformer 26. In accordance with the present invention, there are provided gate circuit units 27, 28, 29, 30, 31, 32, 33, . . . , which is connected between the transformer 26 and each of the electrical output devices 21, 22, 23, 24, 10, 16, . . . . These gate circuit units 27-33, . . . are here desgned to be disabled in response to a failure or shut-off of electric power in the source 25. Thus, once a power failure or shut-off is caused in the source 25, the gate circuit units 27-33, . . . are jointly disabled from communicating the input source 25 or the output of transformer 26 with each of the multiple output devices 21-24, 10, 16, . . . . Each of the gate circuit units will then remain disabled and locked in this state even though the power recovers in the source 25, until an enabling trigger signal develops at its disable/enable input terminal 27b, 28b, 29b, 30b, 31b, 32b, 33b, . . . . The terminals 27b, . . . , 33b, . . are connected respectively to the parallel output terminals 37-43, . . . of a sequential trigger circuit 34 in the form of a sequential counter, e.g. ring counter, fed with clock pulses from a time base or clock 35. The sequential counter 34 operates in response to an output from a sensing circuit 36 operatively coupled with the input transformer 26 for detecting a recovery of electric power in the input source 25.

The sequential counter 34 is operable in response to a recovery of electric power in the input source 25 to initiate counting clock pulses from the time base 35. Each time a preselected number of counts is reached, a trigger signal develops at its outputs 37, 38, 39, 40, 41, 42, 43, . . . sequentially. The sequential trigger signals at these output terminals are fed to the gate circuit units 27, 28, 29, 30, 31, 32, 33, . . . , respectively, through their input terminals 27b, 28b, 29b, 30b, 31b, 32b, 33b, . . . to enable the gate circuit units sequentially, thereby to commence energizing the output devices 21, 22, 23, 24, 10, 16, . . . in a predetermined sequence determined by the sequence of connection between the output devices and the output terminals of the sequential counter 34.

Each of the gate circuit units 27-33, . . . may be of a design as shown in FIG. 2 which illustrates three units of the units 27-33, . . . , viz. 30, 31 and 32, for connecting the transformer 26 to the motor 24 for the fluid supply pump 12, the machining power supply 10 and the NC unit 16 for displacing the workpiece 8 relative to the axis of the wire electrode 1.

In FIG. 2, each gate circut unit is shown comprising an AND gate 44, 45, 46 and a bistable circuit flip-flop 47, 48, 49. Each AND gate 44, 45, 46 has a first input terminal 30a, 31a, 32a leading from the transformer 26, a second input terminal 44b, 45b, 46b fed by the output of the flip-flop 47, 48, 49 and an output terminal 44c, 45c, 46c leading to the output device 24, 10, 16 respectively. Each flip-flop 47, 48, 49 has a set terminal S which is common to the input terminal 30b, 31b, 32b of the unit 30, 31, 32 and a reset terminal R fed from the output terminal 44c, 45c, 46c of the AND gate 44, 45, 46 via an inverter 50, 51, 52 respectively.

In operation, when a power failure or shut-off takes place in the input source 25, the outputs 44c, 45c, 46c of the AND gate 44, 45, 46 are turned to "0" and inverted by the inverter circuits (not gates) 50, 51, 52, to "1" to reset the flip-flops 47, 48, 49. Thus, the AND gates 44, 45, 46 are disabled all at once to hold "0" the output of the gate circuit 30, 31, 32.

When the power recover after the failure or shut-off in the input source 25, the counter 34 initiates counting in response to the detection of the power recovery by the sensing circuit 36 and produces trigger signals at its outputs 40, 41 and 42 sequentially. As a result, the flip-flops 47, 48 and 49 are set to produce "1" outputs sequentially and in turn to enable the AND gates 44, 45 and 46 sequentially. It follows therefore that the output devices 24, 10 and 16 are energized from the input source 25 sequentially.

In the arrangement shown in FIG. 2, further AND gates 61 and 62 are provided at the input sides to the gate circuit units 31 and 32, respectively. The AND gate 61 has a first input leading from the output terminal 41 of the sequential counter 34 and a second input leading from the output 44c of the AND gate 44 to provide a logical product at the terminal 31b. Likewise, the AND gate 62 has a first input leading from the output terminal 42 of the sequential counter 34 and a second input leading from the output 45c of the AND 45 to provide a logical product at the terminal 32b. Thus, only after it has been checked that the output device 24 was energized by the input source 25 and hence has commenced operating can the AND gate 45 be enabled to commence energizing the output device 10. Likewise, only after it has been assured that the output device 10 was energized by the input source 25 and hence has commenced operating can the AND gate 46 be enabled to allow the output device 16 to be energized.

The sequential counter 34, upon issuing the last sequential trigger signal (at its output terminal 43 as shown), is reset to hold all the gate circuit units enabled and hence all the output devices energized, and also so as to be ready for operation upon recovery from a subsequent power failure or shut-off.

What is claimed is:

1. An apparatus for electrically shaping an electrically conductive workpiece with a tool electrode in the presence of a machining fluid medium, the apparatus comprising:
a plurality of electrical output means electrically energizable from a single input source of electric power to perform their respective different operating functions including:
means for pumping said fluid medium into a gap formed between the tool electrode and the workpiece, means for passing an electrical machining current between the tool electrode and the workpiece across said fluid-filled gap to electroerosively remove material from the workpiece and means for relatively displacing the tool electrode and the workpiece to advance the material removal in the workpiece;

a like plurality of gate circuit means each connected between said single input source and a respective one of said plurality of electrical output means, said plurality of gate circuit means being adapted to be disabled in response to a failure or shut-off of electric power in said source for jointly holding said plurality of electrical output means electrically deenergized, respectively; and a sequential trigger circuit means operable in response to a recovery of electric power in said source for sequentially producing a like plurality of trigger signals and enabling said plurality of gate circuit means therewith respectively to commence said respective output means in a predetermined sequence, said plurality of gate circuit means having a like plurality of control input terminals connected respectively with a like plurality of output terminals provided at said sequential trigger circuit means for developing said plurality of trigger signals, respectively, and are adapted to be respectively enabled thereby to commence communicating said single input source with said plurality of output means, respectively said output terminal of the sequential trigger circuit means being so connected with said gate circuit means that said means for passing the electrical machining current is enabled to communicate with said input source later than is said means for pumping the fluid medium and earlier than is said means for relatively displacing the tool electrode and the workpiece.

2. The apparatus defined in claim 1 wherein said tool electrode is a wire electrode and said electrical output means includes means for axially transporting said wire electrode from wire supply means to wire takeup means through said workpiece and wherein said output terminals of the sequential trigger circuit means are so connected with said gate circuit means that said means for axially transporting said wire electrode is enabled to communicate with said input source earlier than is said means for pumping the machining fluid.

3. An apparatus for electrically shaping an electrically conductive workpiece with a tool electrode in the presence of a machining fluid medium, the apparatus comprising:

a plurality of electrical output means electrically energizable from a single input source of electric power to perform their respective different operating functions including:

means for pumping said fluid medium into a gap formed between the tool electrode and the workpiece, means for passing an electrical machining current between the tool electrode and the workpiece across said fluid-filled gap to electroerosively remove material from the workpiece and means for relatively displacing the tool electrode and the workpiece to advance the material removal in the workpiece;

a like plurality of gate circuit means each connected between said single input source and a respective one of said plurality of electrical output means, said plurality of gate circuit means being adapted to be disabled in response to a failure or shut-off of electric power in said source for jointly holding said plurality of electrical output means electrically deenergized, respectively;

a sequential trigger circuit means operable in response to a recovery of electric power in said source for sequentially producing a like plurality of trigger signals and enabling said plurality of gate circuit means therewith respectively to commence said respective output means in a predetermined sequence; and means for sensing an output of one of said plurality of gate circuit means to produce a detection signal representing energization of the corresponding electrical output means connected thereto from said input source and for enabling with said detection signal another of said plurality of gate circuit means to be enabled with the corresponding trigger signal to energize the corresponding electrical output means thereto from said input source.

4. An apparatus for electrically shaping an electrically conductive workpiece with a tool electrode in the presence of a machining fluid medium, the apparatus comprising:

a plurality of electrical output means electrically energizable from a single input source of electric power to perform their respective different operating functions including:

means for pumping said fluid medium into a gap formed between the tool electrode and the workpiece, means for passing an electrical machining current between the tool electrode and the workpiece across said fluid-filled gap to electroerosively remove material from the workpiece and means for relatively displacing the tool electrode and the workpiece to advance the material removal in the workpiece;

a like plurality of gate circuit means each connected between said single input source and a respective one of said plurality of electrical output means, said plurality of gate circuit means being adapted to be disabled in response to a failure or shut-off of electric power in said source for jointly holding said plurality of electrical output means electrically deenergized, respectively;

a sequential trigger circuit means operable in response to a recovery of electric power in said source for sequentially producing a like plurality of trigger signals and enabling said plurality of gate circuit means therewith respectively to commence said respective output means in a predetermined sequence, said plurality of gate circuit means including a first, a second and a third gate circuit means and said plurality of electrical output means includes a first, a second and a third electrical circuit means adapted to be energized sequentially in said predetermined sequence from said single input source when said first, second and third gate circuit means are enabled with a first, a second and a third one of said trigger signals, respectively; and means for sensing, upon said recovery of electric power in said source, energization of said first output means enabled through said first gate circuit means with said first trigger signal to produce a first detection signal representing said energization, enabling with said first detection signal said second gate circuit means to be enabled with said second trigger signal to energize said second electrical output means from said input source, sensing energization of said second electrical output means to produce a second detection signal representing said energization, and enabling with said second detection signal said third gate circuit means to be enabled with said third trigger signal to energize said third electrical output means from said input source.

5. The apparatus defined in claim 4 wherein said first electrical output means comprises said means for pumping the fluid, said second electrical output means is said means for passing the electric current and said third electrical output means in said means for relatively displacing the tool electrode.

6. An apparatus for electrically shaping an electrically conductive workpiece with a tool electrode in the presence of a machining fluid medium, the apparatus comprising:
   a plurality of electrical output means electrically energizable from a single input source of electric power to perform their respective different operating functions including:
   means for pumping said fluid medium into a gap formed between the tool electrode and the workpiece, means for passing an electrical machining current between the tool electrode and the workpiece across said fluid-filled gap to electroerosively remove material from the workpiece and means for relatively displacing the tool electrode and the workpiece to advance the material removal in the workpiece;
   a like plurality of gate circuit means each connected between said single input source and a respective one of said plurality of electrical output means, said plurality of gate circuit means being adapted to be disabled in response to a failure or shut-off of electric power in said source for jointly holding said plurality of electrical output means electrically deenergized, respectively;
   a sequential trigger circuit means operable in response to a recovery of electric power in said source for sequentially producing a like plurality of trigger signals and enabling said plurality of gate circuit means therewith respectively to commence said respective output means in a predetermined sequence, said plurality of gate circuit means including a first, a second, a third and fourth gate circuit means and said plurality of electrical output means include a first, a second, a third and a fourth electrical output means adapted to be energized sequentially in said predetermined sequence from said single input source when said first, second, a third and a fourth gate circuit means are enabled with a first, a second, a third and a one of said trigger signals from said sequential trigger circuit means, respectively; and
   means for sensing, upon said recovery of electric power in said source, energization of said first electrical output means from said input source enabled through said first gate circuit means with said first trigger signal to produce a first detection signal representing said energization, enabling with said first detection signal said second gate circuit means to be enabled with said second trigger signal to energize said second electrical output means from said input source, sensing energization of said second electrical output means to produce a second detection signal representing said energization, enabling with said second detection signal said third gate circuit means to be enabled with said third trigger signal to energize said third electrical output means from said input source, sensing energization of said third electrical output means to produce a third detection signal representing said energization, and enabling with said third detection signal said fourth gate circuit means to be enabled with said fourth trigger signal to energize said fourth electrical output means from said input source.

7. The apparatus defined in claim 6 wherein said tool electrode is a wire electrode and said plurality of electrical output means include means for axially transporting said wire electrode from wire supply means to wire takeup means through said workpiece and wherein said first and second electrical output means comprise one and the other of said means for axially transporting and said means for pumping the fluid medium, respectively, said third electrical output means comprises said means for passing the electrical machining current, and said fourth electrical output means comprises means for relatively displacing the tool electrode and the workpiece.

8. An apparatus for electrically shaping an electrically conductive workpiece with a tool electrode in the presence of a machining fluid medium, the apparatus comprising:
   a plurality of electrical output means electrically energizable from a single input source of electric power to perform their respective different operating functions including:
   means for pumping said fluid medium into a gap formed between the tool electrode and the workpiece, means for passing an electrical machining current between the tool electrode and the workpiece across said fluid-filled gap to electroerosively remove material from the workpiece and means for relatively displacing the tool electrode and the workpiece to advance the material removal in the workpiece;
   a like plurality of gate circuit means each connected between said single input source and a respective one of said plurality of electrical output means, said plurality of gate circuit means being adapted to be disabled in response to a failure or shut-off of electric power in said source for jointly holding said plurality of electrical output means electrically deenergized, respectively;
   a sequential trigger circuit means operable in response to a recovery of electric power in said source for sequentially producing a like plurality of trigger signals and enabling said plurality of gate circuit means therewith respectively to commence said respective output means in a predetermined sequence, said plurality of electrical output means including a first, a second and a third electrical output means prescribed to be energized sequentially in said predetermined sequence and said plurality of gate circuit means include a first, a second and a third gate circuit means connected to said first, second and third electrical output means, respectively, and having their respective input terminals connected with a first, a second and a third output terminal of said trigger circuit means, respectively, for developing a first, a second and a third one of said trigger signals, respectively, and wherein each of said second and third gate circuit means is provided at its input side with a gating control terminal;

first means responsive to an output of said first gate circuit means for producing a first detection signal representing enabling of said first gate circuit means with said first trigger signal incoming through said first input terminal and applying said first detecting signal to the gating control terminal of said second gate circuit means to enable the latter to be enabled with said second trigger signal incoming through said second input terminal to energize said second electrical output means from said input source; and second means responsive to an output of said second gate circuit means for producing a second detection signal representing enabling of said second gate circuit means and applying said second detection signal to the gating control terminal of said third gate circuit means to enable the latter to be enabled with said third trigger signal through said third input terminal to energize said third electrical output means from said input source.

* * * * *